(12) United States Patent
Chang

(10) Patent No.: US 6,308,811 B1
(45) Date of Patent: Oct. 30, 2001

(54) METHOD OF SIDE TRANSMISSION THROUGH UNIDIRECTIONAL CLUTCH AND THE CLUTCH FOR SUCH PURPOSE

(76) Inventor: Chun-Hsiung Chang, No. 5-4, Lane 201, Chung-Hua Rd., Pa-Te City, T'ao-Yuan Hsih (TW)

( * ) Notice: Subject to any disclaimer, the term of this patent is extended or adjusted under 35 U.S.C. 154(b) by 0 days.

(21) Appl. No.: 09/490,088

(22) Filed: Jan. 24, 2000

(30) Foreign Application Priority Data

Feb. 24, 1999 (TW) .................................................. 88102887

(51) Int. Cl.⁷ .................................................. F16D 11/06
(52) U.S. Cl. .................. 192/20; 192/45; 192/415
(58) Field of Search .................................. 192/41 R, 45, 192/41 S, 42, 20

(56) References Cited

U.S. PATENT DOCUMENTS

| | | | |
|---|---|---|---|
| 4,901,832 | * | 2/1990 | Werner ................................... 192/42 |
| 5,318,160 | * | 6/1994 | Oomi et al. ............................. 192/45 |
| 5,349,877 | * | 9/1994 | Bonin et al. ......................... 192/45 X |
| 5,547,055 | * | 8/1996 | Chang et al. ........................... 192/45 |
| 5,779,015 | * | 7/1998 | Murata ................................... 192/42 |
| 6,073,741 | * | 6/2000 | Liu ........................................ 192/45 |

* cited by examiner

*Primary Examiner*—Charles A Marmor
*Assistant Examiner*—Saúl Rodríguez
(74) *Attorney, Agent, or Firm*—Dougherty & Troxell

(57) ABSTRACT

A method of side transmission through a unidirectional clutch is provided. The method includes the step of providing a side transmission gear at one end of a unidirectional clutch body, so that the side transmission gear forms an integral part of the clutch body to bear a turning moment of an applied force. Either an outside-brake or an inner-driving-joint clutch for implementing side transmission with the above-mentioned method is allowed to direct transmit a force in one fixed direction without the need of being mounted in an additional holder in the tight fit manner. The problem of no-load at constant angle in the conventional ratchet-type clutch is eliminated. Moreover, since the clutch having integral side transmission gear does not require high precision tight-fit with an additional holder, it can be produced at simplified process and reduced cost.

11 Claims, 6 Drawing Sheets

METHOD OF SIDE TRANSMISSION THROUGH UNIDIRECTIONAL CLUTCH AND THE CLUTCH FOR SUCH PURPOSE

BACKGROUND OF THE INVENTION

The present invention relates to a method of side transmission through unidirectional clutch and the clutch for such purpose, and more particularly to a method of side transmission through unidirectional clutch that enables easy production of quality-enhanced unidirectional clutch at reduced cost.

Unidirectional clutch that is known for use in sports goods industry usually requires an additional holder that is mounted to an outer periphery of the clutch in a tight-fit manner, such as in the commercially available KK series sold under the brand MORSE and RC, FC, RCB and FCB thin-shell series of different brands. Alternatively, the clutch are mounted in the holder by engagement of key slots provided at an outer circumferential surface of the clutch with keys provided on the holder, such as in the B series sold under the brand MORSE. After being fixedly mounted in the additional holder, the clutch provides one-way transmission through braking elements thereof Since the above- mentioned conventional clutch must have a matched holder connected to it in the tight-fit manner, there is no way to effectively reduce the space required by the clutch and the holder. Moreover, the problem such as the difficulty in effective control of complicate and précised fit of the clutch in the holder also exists in the practical use of the clutch.

Taking the commercially available thin-shell one-way bearing series RC, FC, RCB and FCB (that have a shell thickness less than 2 mm) as an example, the production thereof involves high precision and many complicated procedures, and the fact that a bad yield in terms of matched clutch and holder is still higher than 25%. When the one-way bearing is mounted in the holder in the tight-fit manner and a tight-fit interference thereof is larger than 0.05 mm, the thin-shell one-way bearing would deform and results in poor transmission. On the other hand, when the tight-fit interference is smaller than 0.02 mm, the thin-shell one-way bearing that is subjected to a force to be transmitted tends to slide in the holder and fails to effectively transmit the force. As a matter of fact, it is not easy to meet the strict requirement of proper interference and good match of the clutch with the holder by improving production management and quality control in the process of manufacturing the thin-shell one-way bearings. It is known that all kinds of parts and accessories are produced with an acceptable range of tolerance. And, to enable the one-way bearing to be tight-fitted in the holder with an cumulated tolerance of all related parts and/or accessories thereof still within an acceptable range, it is inevitable to make the bearing and the holder at a very high manufacturing cost.

In addition to the KK and B series of thin-shell one-way bearings sold under the brand MORSE, there are still many other equivalent one-way bearings, such as NF, NFS and NSS series from different manufacturers that all are high-precision products requiring multiple complicated procedures to complete them. These products are expensive and not suitable for incorporating in mass-produced goods that are intended for general consumers.

It is therefore tried by the inventor to develop a method of side transmission through unidirectional clutch to eliminate the additional holder that has to be tight-fitted to the conventional one-way bearing.

SUMMARY OF THE INVENTION

A primary object of the present invention is to provide a method of side transmission through a unidirectional clutch. To achieve this object, the method of the present invention includes the step of providing a side transmission gear at one end of a unidirectional clutch body, so that the side transmission gear forms an integral part of the clutch body to bear a turning moment of an applied force.

Another object of the present invention is to provide a side-transmission clutch to implement side transmission according to the method provided by the present invention. The clutch has an integrally formed side transmission gear and therefore need not be mounted in an additional holder in the tight fit manner. The integral side transmission gear allows the clutch to direct transmit a force in one fixed direction. The side-transmission clutch of the present invention may be either an outside-brake clutch or an inside-brake clutch.

The side-transmission clutch according to the present invention occupies reduced space but provides enhanced ability of side transmission. The problem of no-load at a fixed angle in the conventional ratchet constant-angle transmission, i.e. the ratchet subject to an applied force would have to rotate by at least one-tooth distance to engage with a pawl or the ratchet would rotate reversely to allow engagement of a closest tooth with the pawl, can therefore be avoided. Moreover, since the side-transmission clutch of the present invention does not require high precision tight-fit with an additional holder, it can be produced at reduced cost and simplified process.

However, it is to be noted that the fit tolerance requirement set for conventional one-way bearings also applies to braking elements of the unidirectional clutch of the present invention for actuating an external item connected thereto.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 2b is a sectional view taken on line A—A of FIG. 2a;

FIG. 4b is a perspective of the clutch body of FIG. 4a;

FIG. 5b is a partially cutaway perspective of the clutch body of FIG. 5a;

DETAILED DESCRIPTION OF THE PREFERRED EMBODIMENTS

Figure 1:
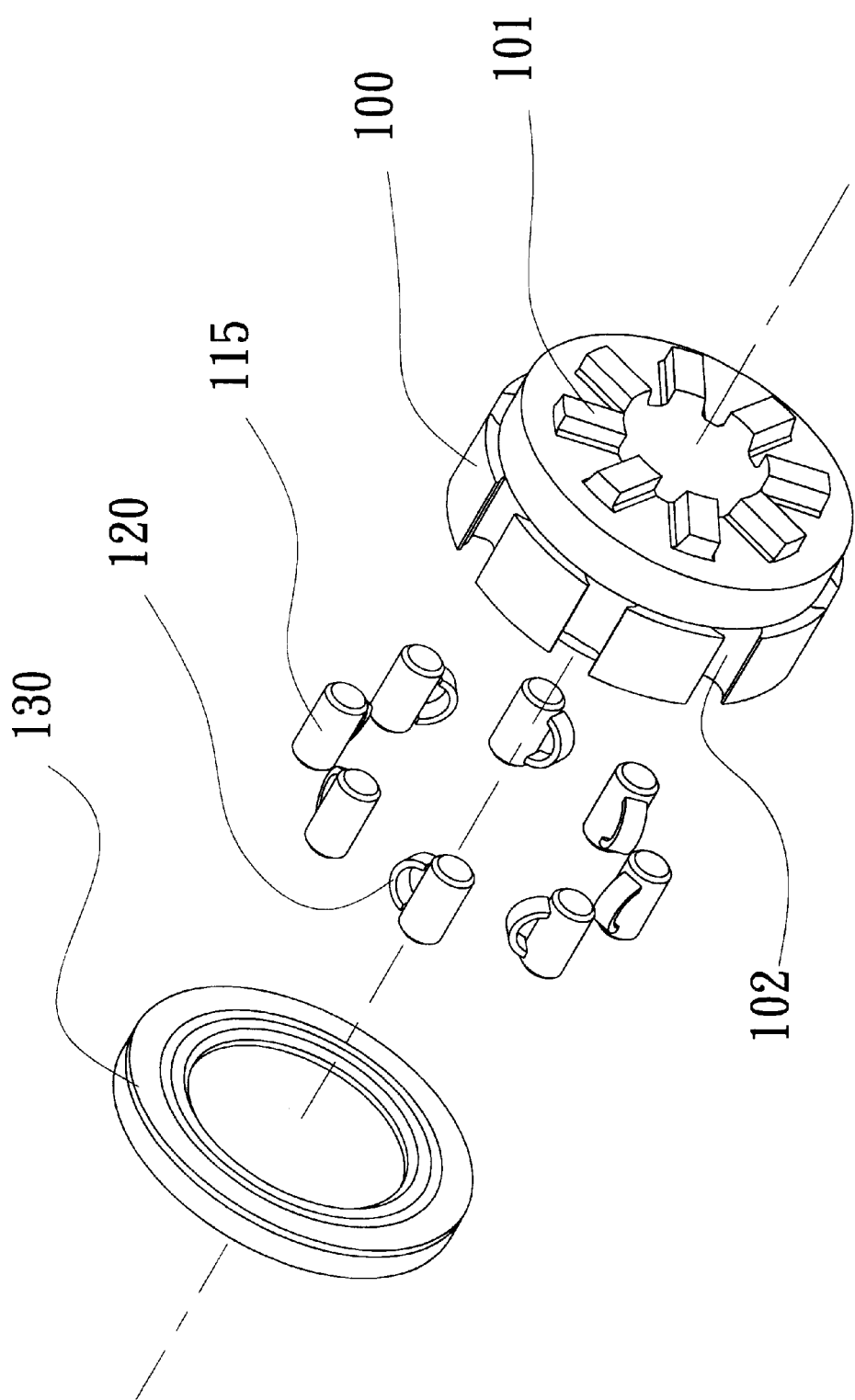
FIG. 1 is an exploded perspective of an outside-brake side-transmission clutch according to a first embodiment of the present invention.
Figure 2B:
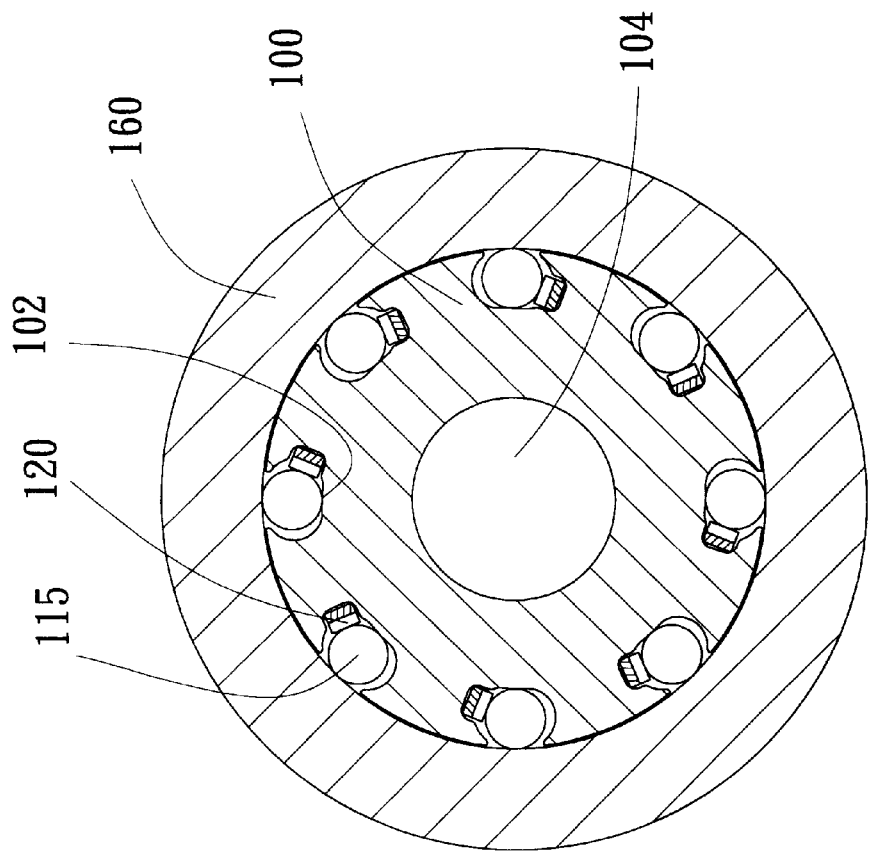
Figure 2A:
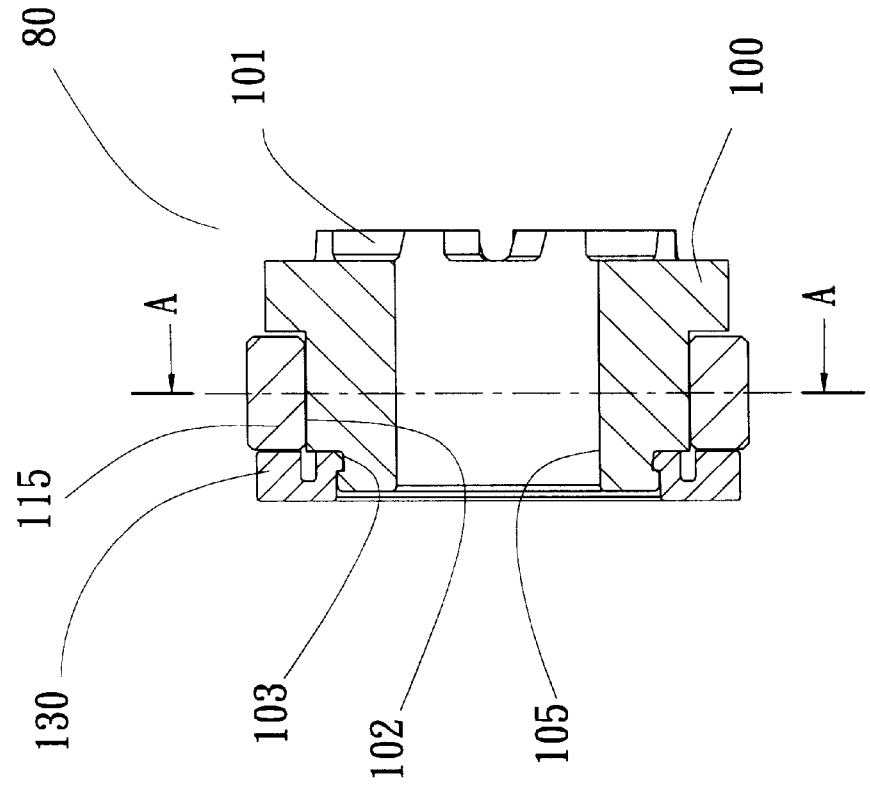
FIG. 2a is an axially sectional view of the clutch of FIG. 1.

Please refer to FIGS. 1, 2a and 2b that are sequentially an exploded perspective view, an axially sectional view, and a cross sectional view of an outside-brake side-transmission clutch according to a first embodiment of the present invention to implement a method of side transmission through a unidirectional clutch also provided by the present invention.

The unidirectional clutch mainly includes an outside-brake clutch body 100, a plurality of braking elements 115, a plurality of elastic elements 120, and a stop ring 130.

The outside-brake clutch body 100 is provided along an external circumferential surface with suitable number of spaced one-way braking recesses 102, at a first end with a side-transmission gear 101, and at a second end opposite to the first end with an annular groove 103. As can be seen from FIG. 2a, the annular groove 103 is immediately adjacent to an open end of the one-way braking recesses 102 facing toward the second end of the clutch body 100. The clutch body 100 also defines a central shaft hole 104, and a circumferential wall of the central shaft hole 104 provides a suitable bearing surface 105.

The braking elements 115 are rotors having a suitable circumferential surface. The elastic elements 120 are made of any suitable elastic material. The stop ring 130 is elastically deformable and has suitable ability of elastic restoring force.

Each of the one-way braking recesses 102 has one braking element 115 and one elastic element 120 disposed therein with the elastic element 120 located between the braking element 115 and an inner wall of the one-way braking recess 102. The stop ring 130 is disposed in the annular groove 103 provided at the second end of the clutch body 100 to stop the braking elements 115 and the elastic elements 120 positioned in the one-way braking recesses 102 from moving out of the one-way braking recesses 102 via the open end thereof.

Please particularly refer to FIG. 2b. An outer member 160 is connected to the external circumferential surface of the clutch body 100. The elastic elements 120 in the one-way braking recesses 102 normally push the corresponding braking elements 115 in a counterclockwise direction when viewing from the first end of the clutch body 100, such that when the clutch body 100 rotates in the outer member 160 in a clockwise direction, the outer member 160 is brought to synchronously rotate clockwise. On the other hand, when the clutch body 100 rotates in the outer member 160 counterclockwise, the outer member 160 could not be brought by the clutch body 100 to rotate counterclockwise. With these arrangements, the unidirectional clutch of the present invention functions to transmit force in only one direction.

Please refer to FIGS. 1 and 2a. The side-transmission gear 101 is integrally provided at the first end of the clutch body 100 and has a properly designed contour, so that the side-transmission gear 101 is capable of actuating an outer member fitly engaged with the side-transmission gear 101.

Figure 3:
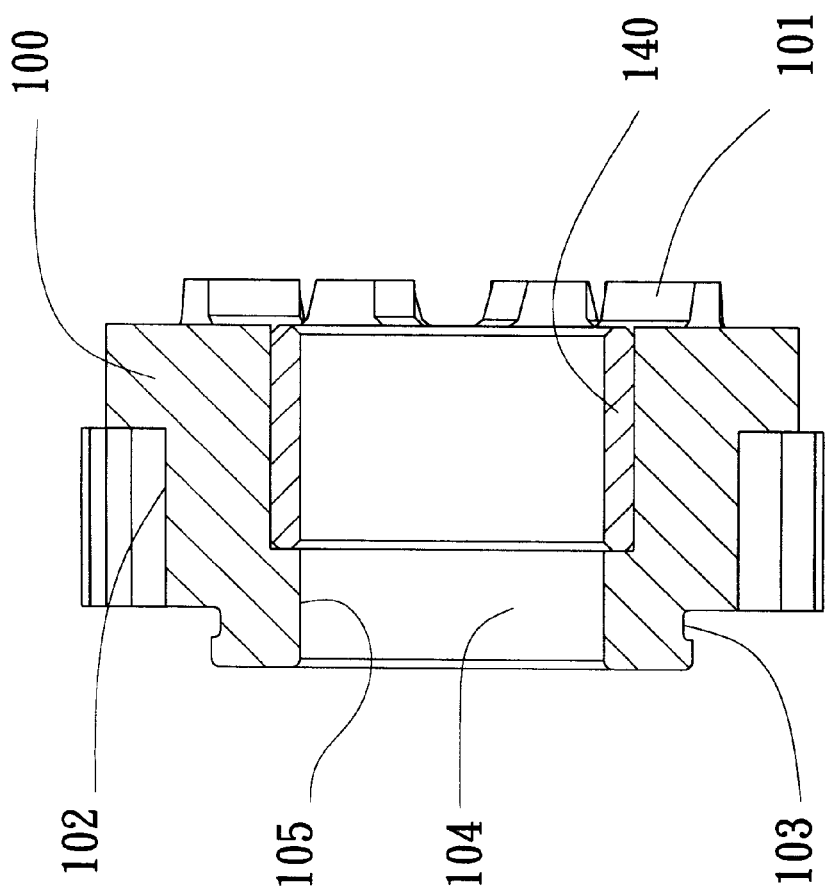
FIG. 3 is an axially sectional view of a clutch body of the outside-brake clutch of FIG. 1 with a bearing mounted therein.

Please refer to FIGS. 2a and 3. The bearing surface 105 in the central shaft hole 104 of the clutch body 100 has predetermined hardness and smoothness to reduce a friction possibly existing between the bearing surface 105 and a shaft (not shown) axially extended through the central shaft hole 104 and therefore reduces a possible friction moment of the shaft. A suitable bearing 140 mounted in the central shaft hole 104 would further reduce the friction between the shaft and the clutch body 100.

Figure 4B:
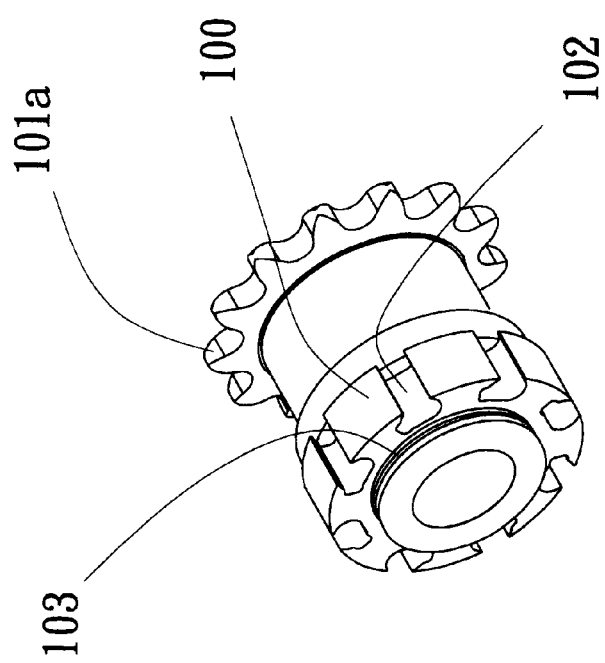
Figure 4A:
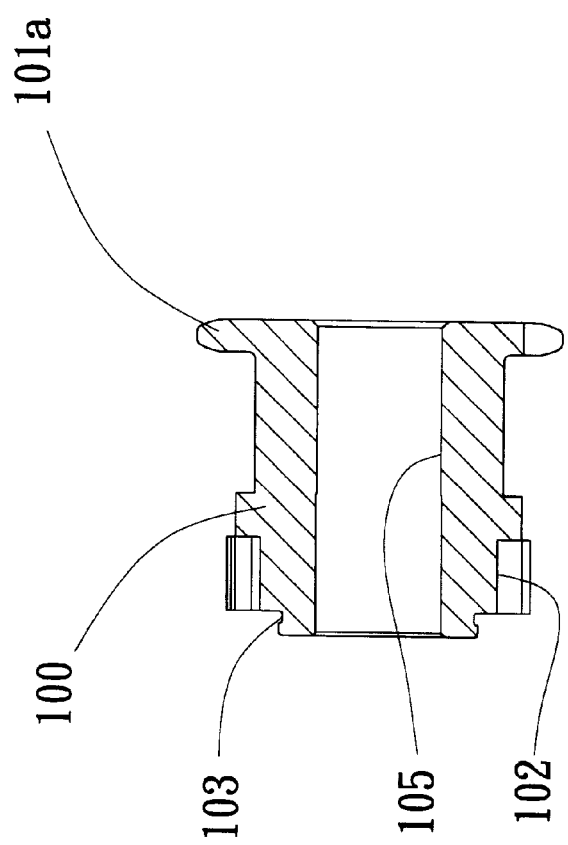
FIG. 4a is an axially sectional view of another clutch body for the outside-brake clutch of the present invention.

Please now refer to FIG. 4a that is an axially sectional view of another type of outside-brake clutch body 100 for the unidirectional clutch of the present invention and FIG. 4b that is a perspective of the clutch body 100 of FIG. 4a.

In this type of clutch body 100, a side-transmission gear 101a extends from the first end of the clutch body 100 to form a chain wheel having a plurality of teeth for mechanically driving an outer item engaged thereto. Such a side-transmission gear 101a not only apparently enables side transmission by the clutch body 100, but also allows the unidirectional clutch of the present invention to associate with a mechanical item through mass production in a simplest and most economical manner. For example, when the central shaft hole 104 has an inner diameter of 10 mm and the side-transmission gear 101a is a chain wheel having a pitch of 6.35 mm, it is possible to have 12 teeth provided on the chain wheel 101a. And, it is also possible for the central shaft hole 104 and the pitch of the chain wheel 101a to have even smaller dimensions. That is, the clutch of the present invention is more suitable for use in a small space to achieve better fit and transmission, compared to conventional one-way bearings.

It is also possible to cover the outside-brake clutch body 100 with an elastic and thin tubular member in order to shield the braking recesses 102 on the outer circumferential surface of the clutch body 100, particularly when the clutch is moved after the production and assembling thereof and during any application of the clutch, so that dust and impurities are prevented from entering into the braking recesses 102 on the clutch body 100 to adversely affect the quality thereof.

FIGS. 5a to 5d illustrate an inside-brake side-transmission clutch according to a second embodiment of the present invention to implement the method of side transmission through a unidirectional clutch provided by the present invention. In this embodiment, the same reference numerals will be used to denote elements that are similar to that in the embodiment of FIGS. 1 to 4. The unidirectional clutch in this embodiment mainly includes an inside-brake clutch body 150, a plurality of braking elements 115, a plurality of elastic elements 120, and a stop ring 130a.

The inside-brake clutch body 150 defines a central shaft hole 104. At least a one-way braking recess 102a is provided in the central shaft hole 104 at a proper position. The inside-brake clutch body 150 is provided at a first end with a side transmission gear 101 and at a second end opposite to the first end with an annular groove 103a. The annular groove 103a is immediately adjacent to an open end of the at least one one-way braking recess 102a facing toward the second end of the clutch body 150. A bearing surface 105a is provided in the central shaft hole 104 at a predetermined position.

The braking elements 115 are rotors having a suitable circumferential surface. The elastic elements 120 are made of any suitable elastic material. The stop ring 130a is elastically deformable and has suitable ability of elastic restoring force.

Figure 5B:
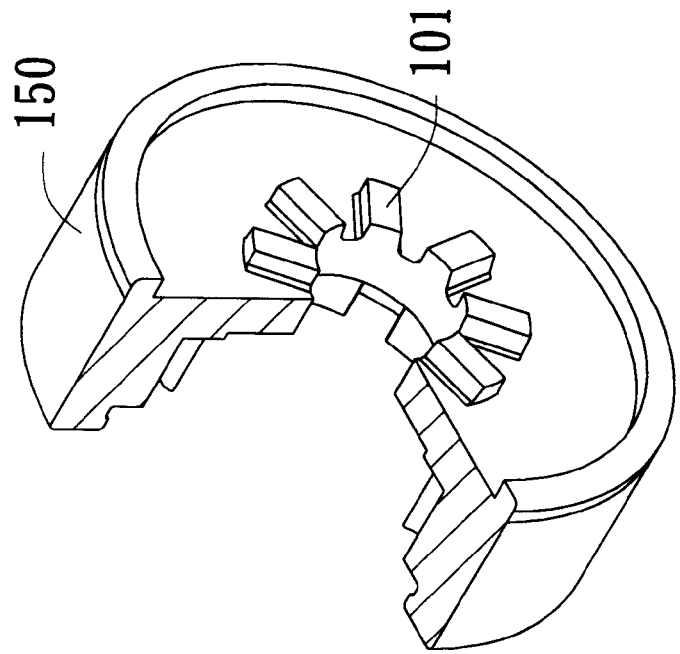
Figure 5A:
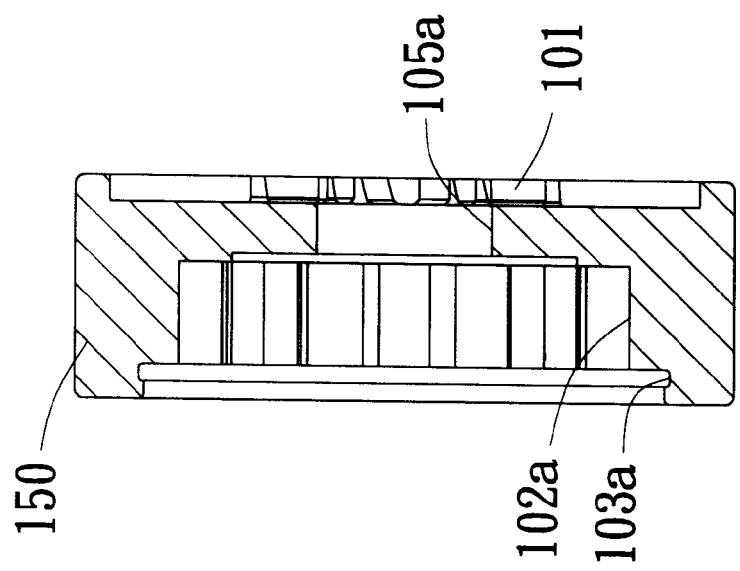
FIG. 5a is an axially sectional view of a clutch body of an inside-brake clutch according to a second embodiment of the present invention.
Figure 5D:
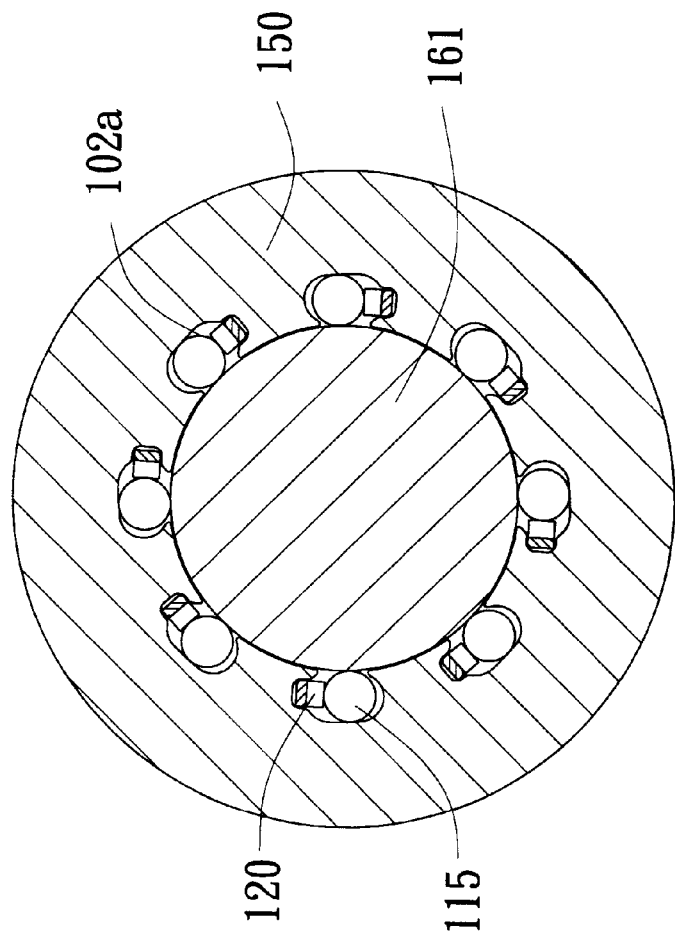
FIG. 5d is a sectional view taken on line B—B of FIG. 5c.
Figure 5C:
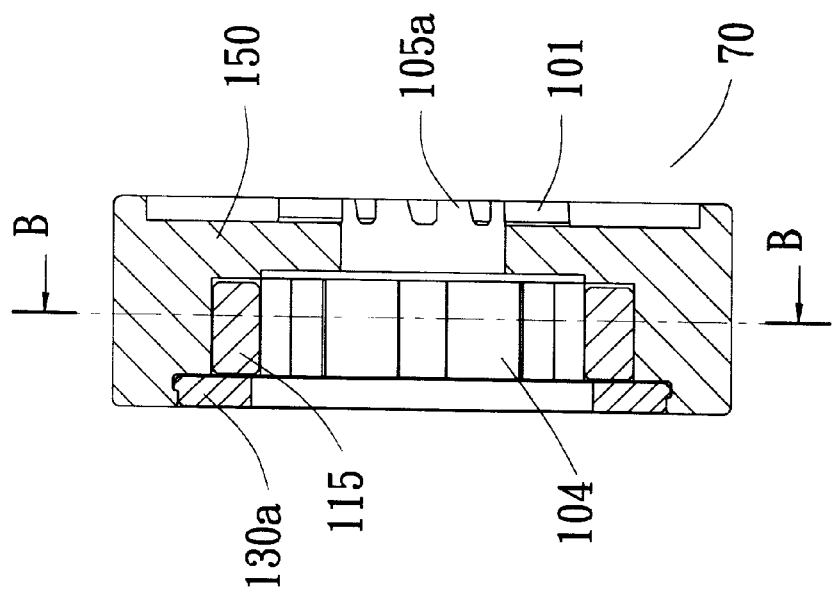
FIG. 5c is an axially sectional view of the inside-brake side-transmission clutch according to the second embodiment of the present invention.

Each one-way braking recess 102a has one braking element 115 and one elastic element 120 disposed therein with the elastic element 120 located between the braking element 115 and an inner wall of the one-way braking recess 102a. The stop ring 130a is disposed in the annular groove 103a provided at the second end of the clutch body 150 to stop the braking elements 115 and the elastic elements 120 positioned in the at least one one-way braking recess 102a from moving out of the one-way braking recess 102a via the open end thereof. FIG. 5c is an axially sectional view of the unidirectional clutch of the present invention for side transmission assembled from the inside-brake clutch body 150, the barking elements 115, the elastic elements 120, and the stop ring 130a.

Just as in the outside-brake clutch of FIGS. 1 to 4, it is possible to insert an elastic and thin tubular member in the central shaft hole 104 of the inside-brake clutch body 150 to shield the at least one braking recess 102a, particularly when the clutch is moved after the production and assembling thereof and during any application of the clutch, so that dust and impurities are prevented from entering into the clutch body 150 to adversely affect the quality thereof.

In brief, the method of side transmission through unidirectional clutch as well as the outside-brake and the inside-brake clutches for achieving side transmission in the method provided by the present invention eliminate the necessity of having the clutch mounted in an additional holder in a tight fit manner as otherwise needed in conventional unidirectional clutches or one-way bearings. Therefore, the clutch of the present invention has simplified overall structure that ensures easy production and enhanced quality at reduced cost. The present invention is therefore most beneficial to mass-produced goods that need unidirectional rotating means.

What is claimed is:

1. A method of side transmission through a unidirectional clutch, comprising the steps of producing a unidirectional clutch body of a predetermined type, and providing a side transmission gear at a predetermined end of said clutch body, such that said side transmission gear has a predetermined contour and forms an integral part of said clutch body for bearing a turning moment of an applied force, whereby said integral side transmission gear allows said unidirectional clutch to direct implement side transmission and need not be mounted in an additional holder in the tight fit manner.

2. An outside-brake clutch for side transmission, comprising an outside-brake clutch body, at least one braking element, at least one elastic element in the same number as that of said braking element, and a stop ring;

said outside-brake clutch body being provided along an external circumferential surface with at least a one-way braking recess, at a first end with a side transmission gear, and at a second end opposite to the first end with an annular groove that immediately adjacent to an open end of said at least one one-way braking recess facing toward the second end of said clutch body; said clutch body also defining a central shaft hole, and a circumferential wall of said central shaft hole providing a bearing surface; said at least one braking element being a rotor having a predetermined circumferential surface; said at least one elastic element being made of any suitable elastic material; and said stop ring being elastically deformable and having suitable ability of elastic restoring force; and each said one-way braking recess having one said braking element and one said elastic element disposed therein, and said stop ring being disposed in said annular groove provided at the second end of said clutch body to stop said braking elements and said elastic elements from moving out of said one-way braking recesses via the open end thereof.

3. An inside-brake clutch for side transmission, comprising an inside-brake clutch body, at least one braking element, at least one elastic element in the same number as that of said braking element, and a stop ring;

said inside-brake clutch body defining a central shaft hole and being provided in said central shaft hole at predetermined positions with at least a one-way braking recess, at a first end of said clutch body with a side transmission gear, at a second end opposite to the first end with an annular groove that is immediately adjacent to an open end of said at least one one-way braking recess facing toward the second end of said clutch body, and at a predetermined position in said central shaft hole with a bearing surface; said at least one braking element being a rotor having a predetermined circumferential surface; said at least one elastic element being made of any suitable elastic material; and said stop ring being elastically deformable and having suitable ability of elastic restoring force; and each said one-way braking recess having one said braking element and one said elastic element disposed therein, and said stop ring being disposed in said annular groove provided at the second end of said clutch body to stop said braking elements and said elastic elements from moving out of said one-way braking recesses via the open end thereof.

4. An outside-brake clutch for side transmission as claimed in claim 2, wherein said side transmission gear includes at least one portion having a predetermined contour for firmly engaging with an outer member connected thereto.

5. An inside-brake clutch for side transmission as claimed in claim 3, wherein said side transmission gear includes at least one portion having a predetermined contour for firmly engaging with an outer member connected thereto.

6. An outside-brake clutch for side transmission as claimed in claim 2, wherein said side transmission gear is a mechanical transmission element extended from the first end of said clutch body and may be a chain wheel, a gear wheel or a belt pulley.

7. An inside-brake clutch for side transmission as claimed in claim 3, wherein said side transmission gear is a mechanical transmission element extended from the first end of said clutch body and may be a chain wheel, a gear wheel or a belt pulley.

8. An outside-brake clutch for side transmission as claimed in claim 2, wherein said bearing surface has predetermined hardness and smoothness to stand rolling friction thereat.

9. An inside-brake clutch for side transmission as claimed in claim 3, wherein said bearing surface has predetermined hardness and smoothness to stand rolling friction thereat.

10. An outside-brake clutch for side transmission as claimed in claim 2, wherein said bearing surface has a predetermined bearing mounted thereat.

11. An inside-brake clutch for side transmission as claimed in claim 3, wherein said bearing surface has a predetermined bearing mounted thereat.

* * * * *